United States Patent [19]

Hartung et al.

[11] Patent Number: 4,625,568
[45] Date of Patent: Dec. 2, 1986

[54] SYSTEM FOR MEASURING THE ENGAGEMENT PRESSURE BETWEEN CYLINDERS OF A PRINTING PRESS

[75] Inventors: Winfried Hartung, Offenbach am Main; Valentin Gensheimer, Mühlheim, both of Fed. Rep. of Germany

[73] Assignee: M.A.N.-Roland Druckmaschinen Aktiengesellschaft, Fed. Rep. of Germany

[21] Appl. No.: 773,052

[22] Filed: Sep. 6, 1985

[30] Foreign Application Priority Data

Sep. 6, 1984 [DE] Fed. Rep. of Germany ....... 3432701

[51] Int. Cl.$^4$ ................................................. G01L 5/00
[52] U.S. Cl. ............................. 73/862.55; 73/862.04; 73/862.64
[58] Field of Search ........... 73/862.55, 862.48, 862.45, 73/862.64, 779, 780, 862.04; 324/207, 208

[56] References Cited

U.S. PATENT DOCUMENTS

| | | | |
|---|---|---|---|
| 2,732,713 | 1/1956 | Willits | 73/779 X |
| 3,226,979 | 1/1966 | Boice | 73/517 B |
| 3,513,711 | 5/1970 | Rogall et al. | 73/517 B |
| 3,965,735 | 6/1976 | Hartung | 73/862.55 |
| 4,351,237 | 9/1982 | Tappert et al. | 73/862.55 X |

Primary Examiner—Charles A. Ruehl
Attorney, Agent, or Firm—Leydig, Voit & Mayer

[57] ABSTRACT

A device for measuring pressure between two cylinders of a press includes a plate mounted to the end of a journal of one of the cylinders in a position perpendicular to the cylinder axis, and a set of electrical proximity sensors measuring the tilting of the plate as a result of slight bowing of the cylinder in response to changes in applied pressure. The proximity sensors are disposed at diametric locations at a substantial radius with respect to the cylinder axis, and an electrical circuit combines signals from the proximity sensors in such a way as to cancel signals generated in response to axial shifting of the cylinder to which the plate is mounted. Preferably the sensors are mounted in the common plane including the two cylinders and a set of sensors is disposed on each side of the plate. Additional sensors can be used to independently measure the pressure applied by a third cylinder engaging the cylinder to which the plate is mounted.

12 Claims, 14 Drawing Figures

FIG. 1
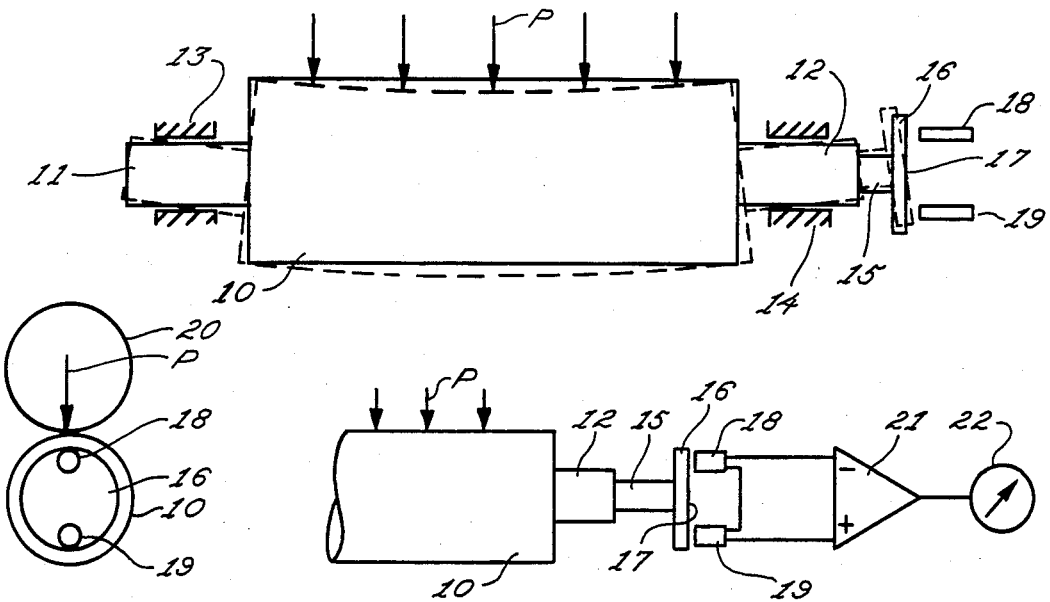
FIG. 2
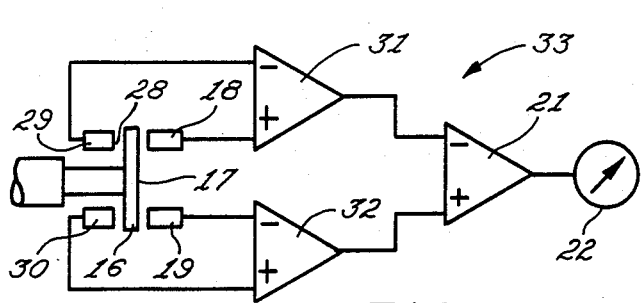
FIG. 3
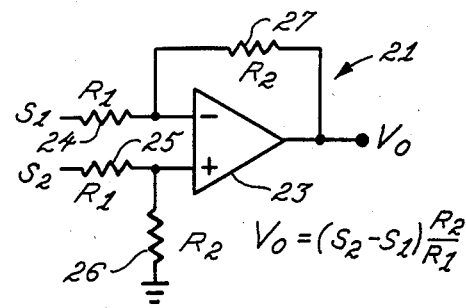
FIG. 5
FIG. 4
$$V_0 = (S_2 - S_1)\frac{R_2}{R_1}$$
FIG. 6
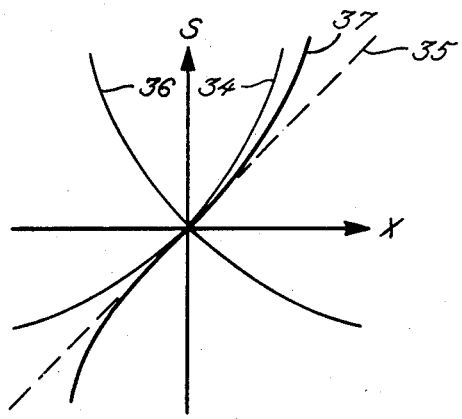
FIG. 7
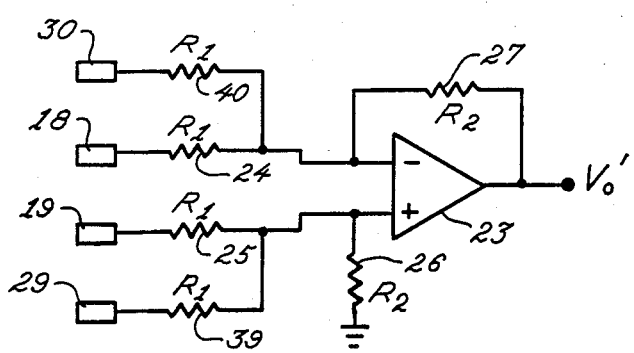

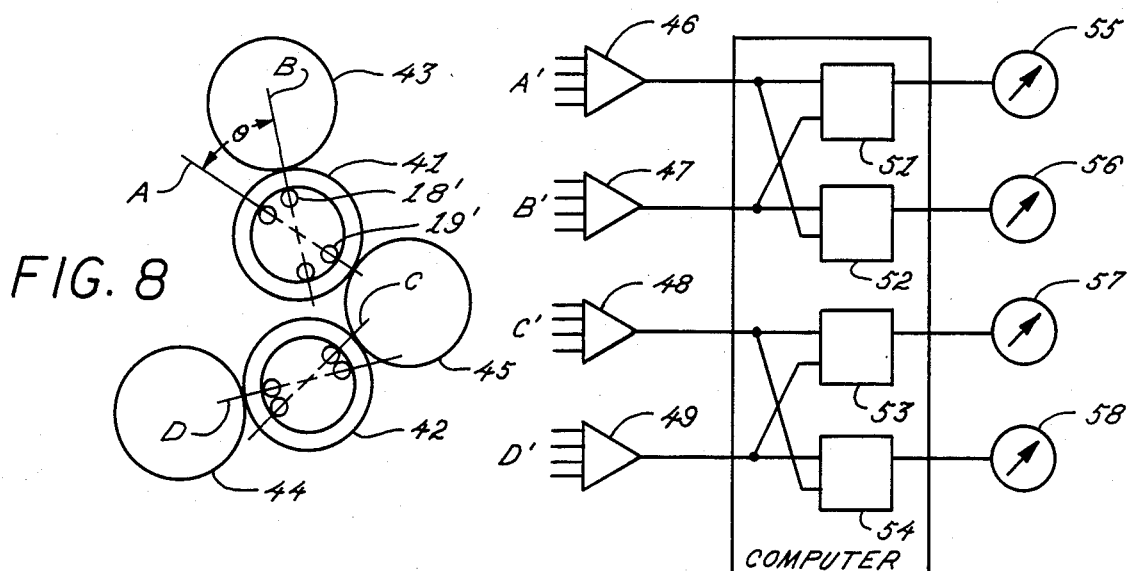
FIG. 8
FIG. 9
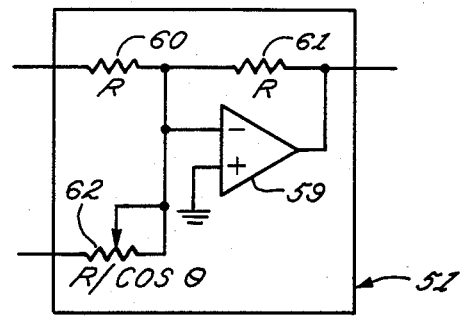
FIG. 10
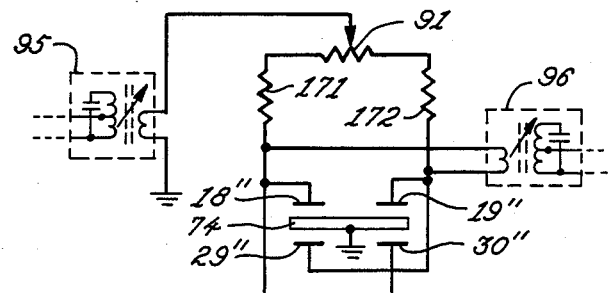
FIG. 14
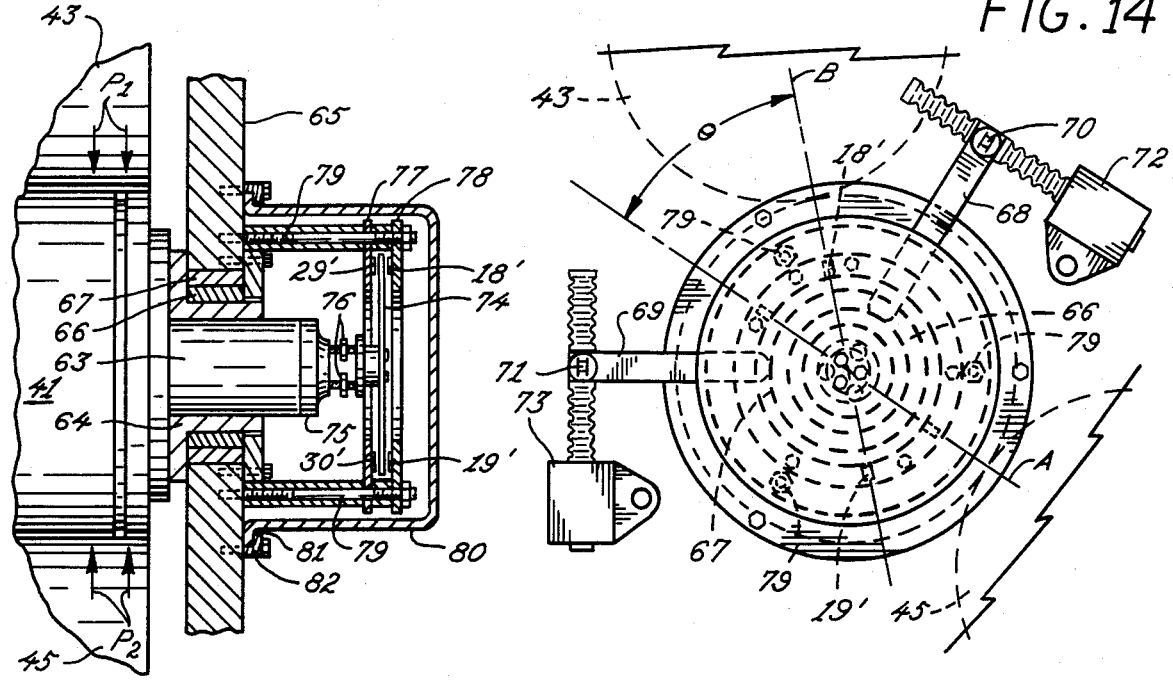
FIG. 11
FIG. 12

4,625,568

SYSTEM FOR MEASURING THE ENGAGEMENT PRESSURE BETWEEN CYLINDERS OF A PRINTING PRESS

BACKGROUND OF INVENTION

1. Field of the Invention

The invention relates to a system for measuring the engagement pressure between two cylinders of a printing press, more particularly the impression cylinder and the inking cylinder of a rotary press.

2. Background Art

To obtain high-quality and reproducible printing, the engagement pressure between the impression cylinder and inking cylinders in a rotary press must be accurately determined and maintained constant. While the press is running, the engagement pressure may change due to changes in the characteristics of the paper, changes in the temperature, and swelling of the blankets mounted on the inking cylinders.

Early attempts at measurement of the engagement pressure included the use of pressure measuring cells or elongation measuring strips such as piezoelectric pressure cells and strain gauges. These techniques are difficult and costly to employ and do not have the long-term stability needed for the continuous monitoring of pressure under actual running conditions.

A suitble device for the continuous monitoring of engagement pressure is described in Hartung U.S. Pat. No. 3,965,735 issued June 29, 1976. A first mirror is fixed to the end of a journal of the one of the cylinders in a position perpendicular to the cylinder axis, and a relatively stationary second mirror is spaced substantially parallel to the first mirror. A light emitter at one edge of the mirrors, and lying in the common plane of the cylinders, directs a concentrated beam of light between the mirrors at a shallow angle of incidence for multiple reflection, with the point of exit of the beam at the other edge of the mirrors shifting in accordance with changes in the angular position of the first mirror as a result of slight bowing of the cylinder in response to changes in the engagement pressure. A photocell at the region of exit receives the beam to produce an output signal which varies in accordance with the shift in the point of exit of the beam to constitute measure of the applied pressure. This known device, however, has the disadvantage that the mirror surfaces may become soiled and oiled up during operation of the press, so that the necessary accuracy of measurement cannot always be ensured.

SUMMARY OF THE INVENTION

Accordingly, the object of the present invention is to provide a system for measuring the engagement pressure between cylinders while the press is running, the system being unaffected by soiling and other press-induced influences.

Briefly, in accordance with the broadest aspect of the present invention, at least two electrical position sensors are provided to sense the axial position of a measurement surface mounted to one end of a journal of one of the cylinders so as to be perpendicular to the axis of the cylinder. The electrical position sensors are responsive to the axial position of the measurement surface at a substantial radius from the cylinder axis at diametric locations. The values measured by the sensors are compared with one another to cancel the effect of axial shifting of the cylinder and measurement surface, and to emphasize the response due to tilting of the measurement surface caused by the engagement pressure. Therefore, this improved measurement system is rugged and reliable and the indicated engagement pressure is not affected by the radial and axial bearing clearances of the cylinder mounting. To maximize the response of the sensors to tilting caused by the engagement pressure, the sensors are preferably located in the common plane of the engagement pressure which includes the axes of the engaging cylinders. Preferably the position sensors are proximity sensors adjacent to the measurement surface and the signals of the sensors are combined by a circuit which subtracts the measured values from one another.

In a preferred embodiment, a disk is mounted perpendicular to the cylinder axis on the end face of a journal of the cylinder and has measurement surfaces on both of its sides. Proximity sensors are disposed adjacent the opposite sides of the disk at the two diametric locations and the measurement signals from the sensors are combined in an amplifier. By using four rather two sensors in this fashion, the linearity or measurement accuracy is improved and the signal level is also increased.

For printing presses having a first cylinder cooperating with a second cylinder and a third cylinder, a measurement surface is preferably mounted to the first cylinder and position sensors are provided in each of the two force planes including the axis of the first cylinder. The signals from the position sensors in one force plane are combined with the signals from the position sensors in the other force plane by means of a computer which generates measurement signals which independently indicate the pressure applied to the first cylinder by each of the second and third cylinders substantially independent of the pressure applied by the other cylinder. A measuring system of this kind has the advantage, for example, in the case of an offset rotary press a single measurement surface mounted to the inking cylinder is sufficient to measure the engagement pressure between the inking cylinder and the form cylinder and between the inking cylinder and the impression cylinder.

The measuring system according to the invention preferably uses inductive or eddy current proximity sensors which can detect small changes of distance with relatively high sensitivity. Capacitive sensors, however, could be used instead. The measured engagement pressure can be displayed to the press operator for manual adjustment of the printing pressure, or the system can be used to generate a control signal for automatic adjustment of printing pressure.

BRIEF DESCRIPTION OF THE DRAWINGS

Other objects and advantages of the present invention will become apparent upon reading the following detailed description and upon reference to the drawings in which:

FIG. 1 is a diagrammatic illustration of the bowing of a cylinder under engagement pressure;

FIG. 2 is an axial view of a schematic diagram of the measuring system of the invention employing two sensors;

FIG. 3 is a side view of the system in FIG. 2;

FIG. 4 is a schematic diagram of an operational amplifier being used to the subtract two signals;

FIG. 5 is a schematic diagram of a measuring system of the present invention using four sensors;

FIG. 6 is a graph of the individual and combined responses of two opposing position sensors showing the linearizing effect of using sensors adjacent each of the opposite sides of the disk or plate mounted on the end face of the cylinder journal;

FIG. 7 is a schematic diagram showing an operational amplifier cuircuit combining the signals from the four position sensors in FIG. 5;

FIG. 8 is a diagrammatic view of position sensors responsive to the pressure applied to the inking cylinders in a two-color offset rotary press;

FIG. 9 is a schematic diagram of a computer circuit for receiving the pressure signals from the sensors in FIG. 8 and computing signals independently indicating the engagement pressures between each cooperating pair of cylinders in FIG. 8;

FIG. 10 is a schematic diagram of the circuit element used in the computer circuit of FIG. 9;

FIG. 11 is a fragmentary end view of a printing cylinder having the improved pressure measuring device of the present invention mounted to one journal thereof and having eccentric mounts for adjusting the engagement pressures applied to the cylinder;

FIG. 12 is an end view of the measuring and adjusting device shown in FIG. 11;

FIG. 14 is a schematic diagram of a bridge circuit for using capacitive proximity sensors instead of the inductive proximity sensors as shown in FIG. 13.

Figure 13:
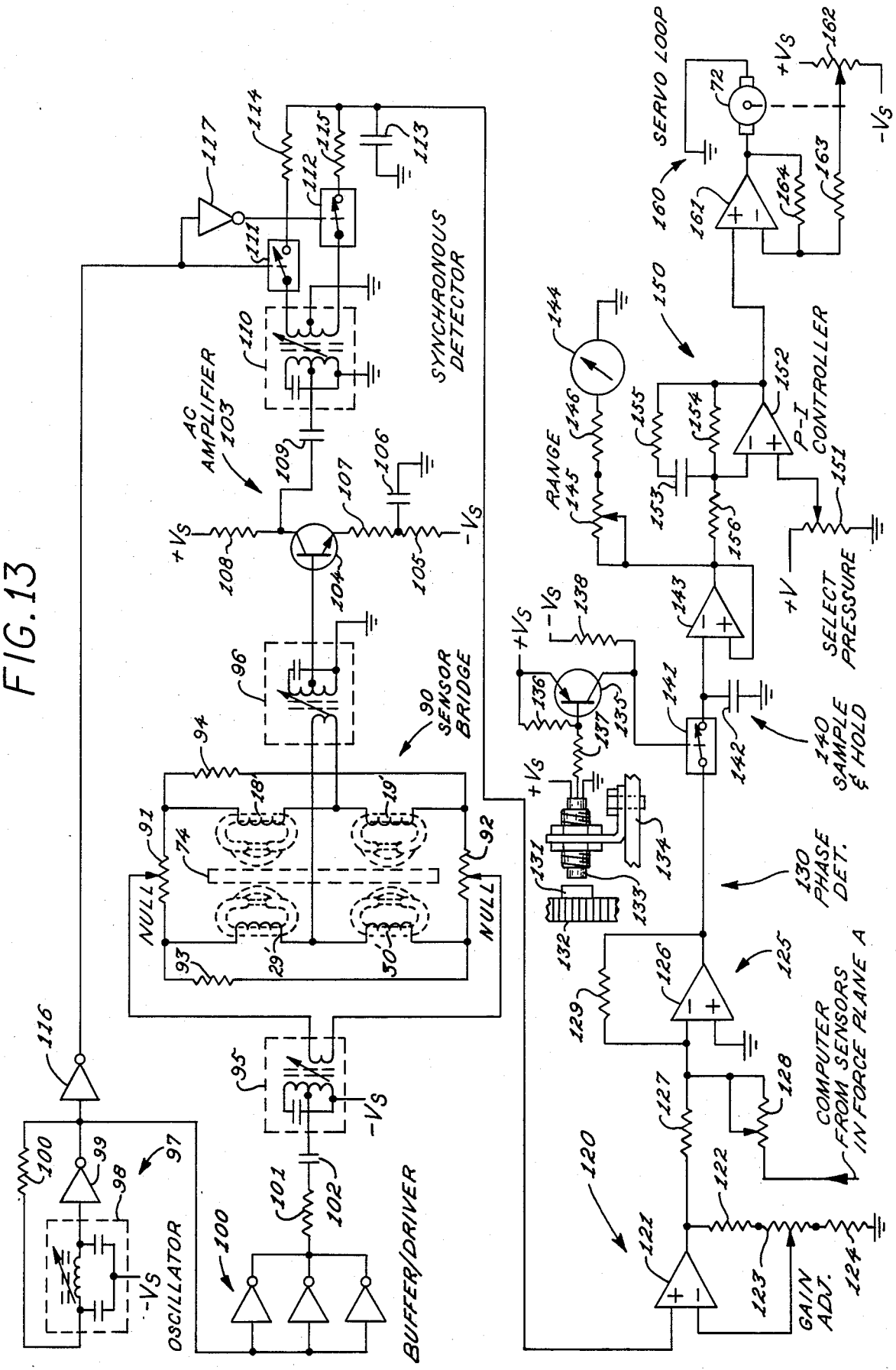
FIG. 13 is a schematic diagram of a control system for automatically regulating the engagement pressure and using a sensor bridge for combining the signals from four inductive proximity sensors.

While the invention has been described in connection with certain preferred embodiments, it will be understood that it is not intended to limit the invention to the embodiments shown but, on the contrary, the intention is to cover the various alternative and equivalent constructions included within the spirit and scope of the appended claims.

DETAILED DESCRIPTION OF THE PREFERRED EMBODIMENTS

Turning now to FIG. 1, there shown a cylinder 10 of a printing press mounted in the conventional fashion by using journals 11, 12 in bearing bushes 13, 14 secured to the press frame. A planar disk or plate 16 is mounted perpendicularly to the cylinder axis and is secured by way of a cylindrical projection 15 to the end face of the journal 12. The disk 16 has a measurement surface 17 sensed by two electrical position sensors 18 and 19. As also shown in FIG. 2, the position sensors 18, 19 are disposed in the plane of the engagement pressure P at a substantial radius from the axis of the cylinder and at diametric locations with respect to the cylinder axis. The position sensors 18, 19, are, for example, type TQ 102 non-contacting eddy-current pickups manufactured and sold by Vibrometer GMBH, Hamburger Allee 55, 6000 Frankfurt 90, West Germany.

The solid lines in FIG. 1 show the cylinder 10 in its unloaded state. When a cooperating cylinder 20 applies an engagement pressure P to the cylinder 10, the cylinder 10 sags and assumes the shape indicated in an exaggerated form by the dashed lines. The sagging of the cylinder 10 tilts the disk 16 so that the surface 17 moves away from the sensor 18 and towards the sensor 19.

The two sensors 18, 19 are interconnected for electrical balancing, as further described below in connection with FIG. 13, and are connected to an amplifier 21 forming the difference between the values measured by the two sensors 18, 19. The difference is indicated by an indicator 22 such as a panel meter. Assuming that the position sensors 18, 19 have a linear output, the arrangement shown in FIG. 3 indicates only tilting of the surfaces 17, because the effect of axial displacement thereof is canceled or compensated for by the amplifier 21. Therefore, axial clearance in the cylinder bearings 13, 14 and longitudinal expansion of the cylinder in response to changes in the working temperature do not distort the indicated measurement.

A specific circuit for the amplifier 21 is shown in FIG. 4. This circuit, which is conventional, uses an operational amplifier 23 with input resistors 24, 25, 26 and a feedback resistor 27. If resistors 24 and 25 are selected to have the same resistance value $R_1$ and resistors 26 and 27 are selected to have the same resistance value $R_2$, then the output $V_o$ is proportional to the difference between the input signals $S_1$ and $S_2$.

Turning to FIG. 5 there is shown a more sensitive engagement pressure measuring system. The disk 16 is provided with a second measurement surface 28 on its side opposite to the measurement surface 17. Two additional electrical position sensors 29, 30 are provided in the force plane at diametric locations opposite the sensors 18 and 19. As shown in FIG. 5, the sensors at the same diametric positions are connected to respective common amplifiers 31 and 32 which are fed to amplifier 21 and indicator 22 as previously described in connection with FIG. 3. The amplifiers 31 and 32, for example, have the same construction as the amplifier 21 which is shown in FIG. 4. By using two sensors at each diametric position and by interconnecting the sensor signals to obtain the function shown in FIG. 5, a measurement sensitivity results which is sufficient for a clear and accurate indication of very small tilting movements of the disk 16. Therefore, the system shown in FIG. 5 is suitable for fairly rigid cylinder constructions.

Turning now to FIG. 6 there is shown a graph illustrating the linearizing effect of using two opposing sensors at the same diametric position. The indicated value S of the signal from the sensor 18 as a function of axial displacement X of the disk 16 is shown as the curve 34. The curve 34 is slightly nonlinear due to the fact the value of the signal S increases more rapidly as a function of displacement X as the measurement surface 17 approaches the sensor 18. Conversely, the response of the sensor 29 on the opposite side of the disk 16 shown as the curve 36 increases more rapidly in the opposite direction. By subtracting the curve 36 from curve 34, and dividing by two to normalize the difference for comparison, a result 37 is obtained which is linear over a broader range than the response 34. The resulting response 37 is the signal obtained from the amplifier 31 shown in FIG. 5. The linearity of the response is important in ensuring that the axial variations of the plate 16 are removed from the indication of engagement pressure.

Turning to FIG. 7, it is shown that the circuit of FIG. 4 can be modified to perform the functions shown in FIG. 5 without using two additional operational amplifiers. Rather, additional resistors 39 and 40 having a value of $R_1$ are provided to add the signal from the sensor 29 to the signal from the sensor 19, and to add the signal from the sensor 30 to the signal from the sensor 18. As described further below in connection with FIG. 13, the operation generally designated 33 in FIG. 5 may also be performed by a bridge circuit.

Turning now to FIG. 8, there is shown a schematic diagram of the cylinders in a two-color offset rotary press. In accordance with an important aspect of the present invention, the engagement pressure on the inking or blanket cylinders 41, 42 can be measured in each of the four force planes A, B, C, D arising from engagement of the inking cylinders 41, 42 and the respective form or plate cylinders 43, 44 and the impression cylinder 45, by using sensors responsive to bowing of only the inking cylinders 41, 42. As suggested by FIGS. 2 and 3, sensors (such as sensors 18' and 19') are provided in each of the force planes A, B, C, D and are mounted at diametric locations with respect to the axes of the inking cylinders 41 and 42. It should be noted, however, that depending on the angle $\Theta$ between the force planes, the sensors in one force plane will respond to engagement pressure in the other force plane associated with the same inking cylinder. To a first approximation, the response of the sensors in one force plane due to the pressure in the other force plane is proportional to the cosine of the angle $\Theta$.

Turning now to FIG. 9 there is shown a circuit for combining the electrical signals A', B', C', D' from the sensors in the respective force planes A, B, C, D in FIG. 8 in order to obtain an engagement pressure indicating signal for each force plane which is independent of the pressure applied in the other force planes. For this purpose the signals A', B', C', D' from the sensors in each of the respective force planes are combined in respective amplifiers 46, 47, 48, 49 each of which corresponds to the circuit shown in FIG. 7, or which corresponds to the sensor bridge and detector circuit shown and described further below in connection with FIG. 13. The outputs of the amplifiers 46, 47, 48, 49 are fed to a computer circuit 50 which includes respective ciruits 51, 52, 53, 54 which add a compensating amount of the signal from the other force plane associated with the respective inking cylinder 41, 42. The compensated values are then fed to respective indicators 55, 56, 57, 58.

Turning now to FIG. 10 there is shown a schematic diagram for one of the compensating circuits 51–54. Due to the geometry of FIG. 8, an engagement pressure in one force plane will cause the sensed engagement pressure in the other force plane, for the respective inking cylinder 41, 42, to decrease by an amount proportional to the engagement pressure in the other force plane including the axis of the respective inking cylinder. Therefore, the effect can be compensated for by adding this proportional amount back to the sensor signal.

Mathematically, for example, the sensor signals A' and B' are related to the forces $P_A$ and $P_B$ in their respective force planes according to:

$$A' = P_A - P_B \cos\Theta$$

$$B' = P_B - P_A \cos\Theta$$

The pressures $P_A$ and $P_B$ are obtained by simultaneously solving these equations to obtain the result:

$$P_A = (A' + B'\cos\Theta)/\sin^2\Theta$$

$$P_B = (B' + A'\cos\Theta)/\sin^2\Theta$$

Therefore, the computation required of each of the circuits 51–54 is identical and is performed, for example, by the adder circuit shown in FIG. 10. This circuit includes an operational amplifier 59 having a first input resistor 60 and a feedback resistor 61 having the same value R. The relative factor of $\cos\Theta$ is obtained by a second input resistor 62 which is variable about the value of $R/\cos\Theta$. The variable resistor 62 is adjusted to null out the effect of pressure variations in one force plane from the indication of pressure for the other force plane with respect to the same respective cylinder 41, 42. The null may be observed, for example, by displaying a trace of the output signal of the amplifier 59 on an oscilloscope and identifying pressure variations caused by a particular one of the two cylinders engaging the respective inking cylinder. These variations are caused, for example, by the various clamping or gripping mechanisms (not shown) associated with the cylinders.

Turning now to FIGS. 11 and 12, the mechanical details of the sensors are shown along with eccentric mounts for adjusting engagement pressure. The inking cylinder 41 has a journal 63 rotating in a bushing 64 which is mounted in one of the sidewalls 65 of the press frame. Interposed between the bushing 64 and the sidewall 65, however, are two eccentric mounts 66 and 67. In order to independently adjust the engagement pressures along the force planes A and B, the eccentrics 66 and 67 are rotatable via respective arms 68 and 69 which are actuated by respective lead screws 70 and 71 driven by respective servo motors 72 and 73. By energizing the servo motor 72, for example, the axis of the inking cylinder 41 is driven in a direction perpendicular to the force plane A so as to adjust the force along the fore plane B. On the other hand, the servo motor 73 is energized to displace the axis of the inking cylinder 41 in a direction perpendicular to the force plane B so as to adjust the engagement pressure along the force plane A.

In order to measure the pressure exerted against the inking cylinder 41 by the form cylinder 43 and the impression cylinder 45, a disk or plate 74 is securely mounted to a pedestal or socket 75 fixed to the end of the journal 63. "Leveling" screws 76, equally spaced and preferably three in number, are interposed between the socket 75 and the disk 74 to enable the disk 74 to be adjusted to a condition of exact perpendicularity with respect to the axis of the cylinder 41 under zero pressure conditions.

In order to determine the axial position of the disk 74 with respect to the sidewall 65 of the frame at a substantial radius from the axis of the cylinder 41, a pair of annular mounting plates 77, 78 are mounted in spaced parallel relation to the disk 74 via three supporting columns 79. Eight proximity sensors including sensors 18', 19', 29' and 30' are mounted to the annular plates adjacent the disk 70 at diametric locations in the force planes and at a fixed radius from the axis of the inking cylinder 41. These proximity sensors are, for example, inductive heads having an air gap emminating an oscillating magnetic field which induces eddy currents in the plate 74 which is a conductive metal such as brass or aluminum. The sensor assembly is enclosed in a cup-shaped housing 80 having a mounting flange 81 which is secured by a circular guiding and clamping member 82 screwed to the sidewall 65 of the press frame. It should be noted that the control arms 68, 69 for adjusting the eccentric mounts protrude through arcuate slots (not shown) in the housing 80.

Turning now to FIG. 13 there is shown a detailed schematic diagram of electronic control circuits associated with one of the force planes A, B, C, D in FIG. 8, and specifically for the force plane B. The inductive pick-up heads 18', 19', 29', 30' are wired in a bridge circuit 90 including two null adjusting potentiometers 91 and 92 and two load equalizing resistors 93 and 94. The sensor bridge 90 is energized at a frequency of 455 kilohertz which is selected to provide good electromagnetic coupling between the inductive pick-up heads and the metal disk 74. The 455 kilohertz frequency is also the standard intermediate frequency for AM broadcast radio receivers. Therefore, readily available intermediate frequency transformers 95, 96 may be used to couple signals to and from the sensor bridge 90.

In order to excite the sensor bridge, the 455 kilohertz frequency is generated by an oscillator generally designated 97 comprising an oscillator tank circuit 98, a CMOS inverter 99, and a feedback resistor 100. The inverter 99 is a CMOS part No. 4049 such as RCA Corporation Part No. CA4049. The feedback resistor 100, for example, has a value of 10 K ohms. The tank circuit 90 provides 180° of phase shift at the 455 kilohertz frequency. To excite the sensor bridge 90, the output of the oscillator 97 is buffered by three CMOS inverters generally designated 101, all part number 4049, which are wired in parallel. The outputs of the inverters 100 drive the primary of the first intermediate frequency transformer 96 through a current limiting resistor 101 of 470 ohms and a coupling capacitor 102 of 0.01 microfarads.

The sensor bridge 90 has dual null potentiometers 91 and 92 in order to permit the bridge to be both nulled and electrically balanced for sensor gain variation. The two null potentiometers 91 and 92 preferably have concentric shafts with frictionally coupled control knobs. Therefore, differential displacement of the control knobs adjust the null of the sensor bridge while a common adjustment of the control knobs adjust the sensors for gain variation and thus nulls out the effect of axial displacement of the disk 74. The potentiometers 91 and 92 have resistances of 470 ohms and the resistors 93 and 94 have values of 2.2 k ohms.

The output of the bridge excites the low impedance coil of the second intermediate frequency transformer 96. In order to provide good noise rejection, the AC output of the bridge is amplified before being detected. The output of the second intermediate frequency transformer 96 is fed to an AC amplifier generally designated 103 employing an NPN transistor 104 in a common emitter circuit. Associatd with the transistor 104 is a current sinking resistor 105 of 10 K ohms, an emitter bypass capacitor 106 of 0.05 microfarads, a degeneration resistor 107 of 220 ohms, a load resistor 108 of 4.7 K ohms and an output coupling capacitor 109 of 0.01 microfarads. The degeneration resistor 107 ensures that the AC amplifier has a relatively stable voltage gain of about 20.

In order to generate a bipolar DC voltage proportional to the tilting of the disk 74, the AC amplifier 103 drives a synchronous detector including a center tapped intermediate frequency transformer 110, electronic switches 111, 112, and a low-pass filter comprising a shunt capacitor 113 and series resistors 114 and 115. The resistors 114, 115 have a value of 10 K ohms and the capacitor 113 has a value of 1 microfarad. The electronic switches 111 and 112 are CMOS part number 4016, such as RCA Corporation Part Number CA4016. These electronic switches are driven 180° out of phase at the 455 kilohertz frequency by inverters 116 and 117 which are CMOS part number 4049.

The output of the synchronous detector is fed to a variable gain amplifier generally designated 120 including an operational amplifier 121, a resistor 122, a potentiometer 123 and a resistor 124. The operational amplifier 121 is, for example, part number 741. The resistor 122 sets the minimum gain and has a value, for example, of 100 K ohms. The potentiometer 123 has a value, for example, of 10 K ohms. The resistor 124 sets the maximum gain of amplifier and has a value, for example, of 470 ohms.

To compensate the signal from the sensors in the B force plane from forces in the A force plane (see FIG. 12) a computer circuit generally designated 125 is provided having an operational amplifier 126, an input resistor 127, a variable input resistor 128 and a feedback resistor 129. The operational amplifier 126 is, for example, part number 741. The resistors 127 and 129 have values of 22 K ohms and the variable resistor 128 has a value of 100 K ohms.

It should be noted that the cross-section of the inking cylinder 41 is not radially symmetric. Therefore, the sag of the inking cylinder 41 in response to a constant engagement pressure varies depending upon the phase of the inking cylinder 41 with respect to the press frame. According to an important aspect of the invention, to compensate for the resulting variations in measured values, the value indicated by the sensor bridge 90 is detected or evaluated only at a selected phase of the inking cylinder 41. For this purpose means 130 are provided for detecting a predetermined phase of the inking cylinder 41. As shown in FIG. 13, a magnet 131 is fastened to a drive gear 132 driving the impression cylinder 41. The position of the magnet 131 is sensed by a Hall effect sensor 133 mounted to the press frame 134. The Hall effect sensor 133 is, for example, part number 103SR5A-1 manufactured by Micro Switch, a Honeywell Division, Freeport, Ill. 61032, which uses a supply voltage $V_s$ of 5 volts. The Hall effect sensor 133 sinks current in rsponse to the proximity of the magnet 131. To obtain a positive logic signal within the supply range of $-V_s$ to $+V_s$, the output of the Hall effect sensor 133 is fed to a PNP transistor level shifter comprising a PNP transistor 135, a current sourcing resistor 136, a current limiting resistor 137, and a load resistor 138. The resistors 136, 137, 138 have a value, for example, of 10 K ohms. The positive logic signal enables a sample-and-hold circuit generally designated 140 comprising an electronic switch 141, a storage capacitor 142, and a high input impedance operational amplifier 143. The electronic switch 141 is, for example, CMOS part number 4016. The capacitor 142 has a value, for example, of 0.1 microfarad and the operational amplifier 143 is, for example, a bi-fet operational amplifier such as RCA Corporation Part Number CA3140.

For indicating the engagement pressure, the sampled value is displayed by a panel meter 144. The panel meter is, for example, a DC milliameter. The milliammeter 144 has a range adjusting variable resistor 145 and a current limiting resistor 146. The variable resistor 145 is, for example, a 1 K ohm resistor and the current limiting resistor 146 is, for example, is a 1.5 K ohm resistor.

In accordance with another feature of the invention, the measured value from the sensor bridge 90 is averaged over one or more cylinder revolutions before it is evaluated or indicated. For control purposes, the averaging is performed by a proportional-integral controller circuit generally designated 150 that has a time constant of a few seconds. The desired pressure is selected by a 10 K ohms potentiometer 151. The value selected by the potentiometer 151 is compared to the pressure indicating voltage by an operational amplifier 152 such as part number 741. The indicated value, however, is averaged or integrated by a capacitor 153 having a time constant set by a negative feedback resistor 154. The feedback resistor 154 has a value, for example, of 1 megohm and the capacitor 153 has a value, for example, of 5 microfarads. For stability, the controller 115 has proportional response set by a lead-lag resistor 155 having a value, for example, of 10 K ohms. The gain of the controller is set by an input resistor 156 having a value, for example, of 4.7 K ohms.

The output of the controller 150 is fed to a conventional servo drive circuit generally designated 160 including a servo driver 161, the servo motor 72 (see FIG. 12) a position sensing potentiometer 162 associated with the servo motor 72, and resistors 163 and 164 setting the servo loop gain.

Turning now the FIG. 14, there is shown a bridge circuit for using capacitive proximity sensors 18″, 19″, 29″, and 20″ in the control circuit of FIG. 13. The capacitive proximity sensors are in the form of metal plates separated from the disk 74 by a distance d. The disk 74 is grounded to the press frame and provides a common ground for the capacitive sensors. Therefore, the capacitance of each probe is a function of the area A of the probe according to $C = 0.244 \, A/d$, where C is in picofarads, A is the probe area in square inches, and d is in inches.

For use in the control circuit of FIG. 5, the reactance of each probe should be about 2 K ohms. Resistors 171 and 172 in FIG. 14 provide a matching impedance and each should have a value of 1 K ohm. Therefore, the capcitance of each probe should be about 200 picofarads at the 455 kilohertz excitation frequency. For a probe area of 8 square inches, for example, the distance d between each probe and the disk 74 should be about one hundredth of an inch. Smaller capacitive probes, however, could be used if the AC excitation frequency were increased.

In view of the above, a system has been described for measuring and controlling the engagement pressure between cylinders in a press while the press is running, the system being unaffected by soiling and other press-induced influences. The system is rugged and reliable and is not affected by the radial and axial bearing clearances of the cylinder mountings.

What is claimed is:

1. A system for measuring the engagement pressure between first and second cylinders in a printing press frame along a common plane containing the axes of the two cylinders, the system being of the kind wherein the first cylinder has a pair of journals supported in respective bearings in the press frame, a planar measurement surface being mounted to one end of the journals perpendicular to and radially with respect to the axis of the first cylinder for rotation with the first cylinder, and the tilting of the measurement surface with respect to the press frame being sensed to measure the engagement presure, wherein the improvement comprises at least two electrical sensors responsive to the axial positions of the measurement surface with respect to the press frame at a substantial radius from the axis of the first cylinder and at diametric locations with respect to the axis of the first cylinder, and means for comparing the responses of the two sensors to obtain measured values of the engagement pressure so as to reduce the response of the measurement systems to axial play in the bearings supporting the first cylinder.

2. The measurement system as claimed in claim 1, wherein said diametric locations are located in said common plane.

3. The system as claimed in claim 1, wherein the measurement surface is a metal plate and the sensors are inductive proximity sensors.

4. The system as claimed in claim 1, wherein the measurement surface is a metal plate and the sensors are capacitor probes responsive to the capacitance between the probes and the measurement surface.

5. The system as claimed in claim 1, wherein the sensors are proximity sensors and the means for comparing is a comparator circuit for forming the difference between the responses of the two sensors.

6. The system as claimed in claim 5, wherein the sensors are proximity sensors mounted on the same side of the plane of the measurement surface.

7. The system as claimed in claim 1, wherein said two sensors are proximity sensors mounted on a first side of the plane of the measurement surface, and two additional proximity sensors are mounted at said diametric locations on the second side of the plane of the measurement surface, the responses of the sensors located at the same diametric locations being compared with each other by said means for comparing so as to obtain a more linear response to the axial position of the measurement surface at said diametric locations.

8. The system as claimed in claim 1, wherein said diametric locations are located in said common plane, and further comprising a third cylinder in the printing press frame along a common plane containing the axes of the first and third cylinders, two additional sensors for sensing the axial position of the measurement surface with respect to the press frame at a substantial radius from the axis of the first cylinder at diametric locations with respect to the cylinder axis in the common plane of the axes of the first and third cylinders, and computational circuits responsive to all four sensors for generating a first signal responsive to the engagement pressure between the first and second cylinders substantially independent of the engagement pressure between the first and third cylinders, and for generating a second signal responsive to the engagement pressure between the first and third cylinders substantially independent of the engagement pressure between the first and second cylinders.

9. The system as claimed in claim 1, wherein the measured values provided by the means for comparing are averaged over at least one revolution of the first cylinder during operation of the printing press.

10. The system as claimed in claim 1, further comprising means for detecting a predetermined phase angle of the first cylinder with respect to the press frame, and means for selecting said measured values of printing pressure occurring at said predetermined phase angle of the first cylinder in response to said means for detecting.

11. In a printing press having a press frame, a first cylinder having a pair of journals supported in respective bearings in the press frame, second and third cylinders engaging the first cylinder along common planes, each common plane containing the axis of the first cylinder and the axis of a respective one of the second and third cylinders, a system for measuring the respective engagement pressures between the first cylinder and each of the second and third cylinders comprising, in combination, a plate being mounted to one end of the journals perpendicular to and radially with respect to the axis of the first cylinder, the plate having two planar measurement surfaces on its two respective sides, axial positions of the measurement surfaces with respect to the press frame being sensed by electrical proximity sensors mounted to the press frame and disposed in said common planes at a substantial radius from the axis of the first cylinder at diametric locations, said proximity sensors including a first set disposed on one side of said plate adjacent to a first one of said measurement surfaces and a second set disposed on the other side of said plate adjacent to a second one of said measurement surfaces, and electrical circuit means for combining electrical signals from said proximity sensors disposed in the respective common planes to generate respective signals indicating the respective printing pressures between the first cylinder and each of the second and third cylinders, said electrical circuit canceling said electrical signals generated in response to axial variations of the first cylinder and reinforcing electrical signals generated in response to tilting of said plate with respect to the press frame.

12. The measurement system as claimed in claim 11, wherein said electrical circuit means further comprises means for combining said electrical signals from the proximity sensors in the first common plane with said electrical signals from the proximity sensors in the second common plane so that the indication of pressure between the first cylinder and each of the second and third cylinders is substantially independent of the pressure between the first cylinder and the other of the second and third cylinders.

* * * * *